US005690723A

United States Patent [19]
Sano et al.

[11] Patent Number: 5,690,723
[45] Date of Patent: Nov. 25, 1997

[54] INK COMPOSITION SUITABLE FOR INK JET RECORDING

[75] Inventors: Yukari Sano; Junko Takatsuna; Kazuaki Watanabe; Kiyohiko Takemoto, all of Suwa, Japan

[73] Assignee: Seiko Epson Corporation, Tokyo, Japan

[21] Appl. No.: 587,578

[22] Filed: Jan. 17, 1996

[30] Foreign Application Priority Data

Jan. 18, 1995 [JP] Japan .................................. 5-005854

[51] Int. Cl.⁶ .................................................... C09D 11/02
[52] U.S. Cl. .................................... 106/31.75; 106/31.6
[58] Field of Search ........................... 106/20 R, 20 D, 106/23 H, 23 R, 31.75, 31.6

[56] References Cited

U.S. PATENT DOCUMENTS

| | | | |
|---|---|---|---|
| 5,106,417 | 4/1992 | Hauser et al. | 106/20 D |
| 5,160,370 | 11/1992 | Suga et al. | 106/19 R |
| 5,172,133 | 12/1992 | Suga et al. | 106/20 D |
| 5,451,251 | 9/1995 | Mafune et al. | 106/22 H |
| 5,462,590 | 10/1995 | Yui et al. | 106/22 H |
| 5,580,374 | 12/1996 | Okumura et al. | 106/20 R |

*Primary Examiner*—Helene Klemanski
*Attorney, Agent, or Firm*—Ladas & Parry

[57] ABSTRACT

An ink composition is provided which, when used for ink jet recording, does not clog a recording head and provides a high-quality print and, at the same time, has high storage stability. The ink composition comprises a pigment, a dispersant, and water, the dispersant being a polymeric dispersant having a carboxyl group, the ink composition further comprising a hydroxide of an alkali metal and an alcoholamine having at least one hydroxyl group.

15 Claims, No Drawings

INK COMPOSITION SUITABLE FOR INK JET RECORDING

BACKGROUND OF THE INVENTION

1. Field of the Invention

The present invention relates to an ink composition containing a pigment as a colorant, and more particularly to an ink composition suitable for ink jet recording.

2. Background Art

Various aqueous ink compositions comprising a dye as a colorant and an aqueous medium have been put to practical use as an ink composition. These aqueous ink compositions, however, suffer from poor light fastness and water resistance of the print due to the nature of the dye as the colorant. For this reason, an ink composition using a pigment as a colorant has been proposed in the art.

The pigment, however, is basically insoluble in an aqueous solvent and an organic solvent. Therefore, in an ink using a pigment as the colorant, the pigment should be finely dispersed in a stable state. This is because, in ink jet recording, ink droplets should be elected through very small nozzle holes, and the creation of a precipitate in the ink composition is causative of clogging of the nozzles.

Various proposals have been proposed on methods of stably dispersing a pigment in an ink composition. For example, Japanese Patent Publication No. 35434/1980 proposes the use of a polymer, having a lipophilic moiety and a hydrophilic moiety, as a dispersant for a pigment. Further, Japanese Patent Publication No. 5703/1992 proposes the use of a polymer with a molecular weight falling within a specific range, having a lipophilic moiety and a hydrophilic moiety, as a dispersant for a pigment.

However, a need still exists for an ink composition stably containing a pigment. In particular, regarding ink jet recording, there is an ever-increasing demand for an ink composition having better properties. As described above, the ink composition used in ink jet recording should not clog the nozzle of a recording head. In addition, it should realize an image free from bleeding and feathering and having a high print density. Furthermore, liquid properties (for example, viscosity, surface tension, and electric conductivity) compatible with election conditions (for example, driving voltage of a piezoelectric element, driving frequency, shape and material of an orifice for ejecting ink droplets, and the diameter of the orifice) are required of the ink composition.

SUMMARY OF THE INVENTION

An object of the present invention is to provide an ink composition which contains a pigment in a more stable state.

Another object of the present invention is to provide an ink composition, for ink jet recording, which does not cause clogging of a recording head and can realize an image having a good quality.

We have now found that a combination of a particular dispersant, a hydroxide of an alkali metal, and an alcoholamine having at least one hydroxyl group can provide an ink composition having good properties.

Accordingly, the ink composition of the present invention comprises a pigment, a dispersant, and water, the dispersant being a polymeric dispersant having a carboxyl group, the ink composition further comprising a hydroxide of an alkali metal and an alcoholamine having at least one hydroxyl group.

PREFERRED EMBODIMENTS OF THE INVENTION

Recording using ink composition

The ink composition of the present invention is suitable for recording using a ballpoint pen, a fountain pen or the like as well as for ink jet recording.

In particular, it, when used in ink jet recording, is much less likely to clog a recording head. It was found that the ink composition of the present invention is especially less likely to create a precipitate within a very small nozzle hole of a recording head. More specifically, after a recording head filled with the ink composition of the present invention is allowed to stand for one month under severe conditions, i.e., at an environment temperature of 40° C. without capping (capping being usually carried out for preventing the evaporation of the ink composition), it can immediately resume normal printing. This effect is significant in the case of an ink composition containing a hydroxide of an alkali metal in combination with an alcoholamine having at least one hydroxyl group, and the addition of any one of these additives cannot offer this effect. This effect attained by coexistence of the hydroxide of an alkali metal with the alcoholamine would be a surprising fact to a person having ordinary skill in the art.

Dispersant

The dispersant used in the present invention is a polymeric dispersant having a carboxyl group. Preferred is, for example, a resin, having a carboxyl group, which, when in the form of a salt, is soluble in water, and specific examples of such resins include polyacrylic acid, polymethacrylic acid, acrylic acid/acrylonitrile copolymer, vinyl acetate/acrylic ester copolymer, acrylic acid/alkyl acrylate copolymer, styrene/acrylic acid copolymer, styrene/methacrylic acid copolymer, styrene/acrylic acid/alkyl acrylate copolymer, styrene/methacrylic acid/alkyl acrylate copolymer, styrene/α-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid/vinylethylene copolymer, vinyl acetate/maleic ester copolymer, vinyl chloride/crotonic acid copolymer, and vinyl chloride/acrylic acid copolymer.

According to a preferred embodiment of the present invention, the resin preferably has a weight-average molecular weight of 3,000 to 50,000, still preferably 5,000 to 30,000, most preferably 7,000 to 15,000.

The amount of the dispersant added may be properly determined so that the pigment can be dispersed without sacrificing the other effects of the present invention. According to a preferred embodiment of the present invention, regarding the amount of the dispersant added, the ratio of the pigment to the dispersant is preferably in the range of from 1:0.06 to 1:3, still preferably in the range of from 1:0.125 to 1:3.

Hydroxide of alkali metal

According to a preferred embodiment of the present invention, the hydroxide of an alkali metal is selected from the group consisting of lithium, sodium, and potassium.

The amount of the hydroxide of an alkali metal added is preferably in the range of from 0.1 to 1% by weight, more preferably in the range of from 0.1 to 0.5 % by weight.

Alcoholamine

The alcoholamine used in the present invention has at least one hydroxyl group. According to a preferred embodiment of the present invention, the alcoholamine is selected from the group consisting of monoethanolamine, diethanolamine, and triethanolamine.

The amount of the alcoholamine added is preferably in the range of from 0.1 to 2% by weight, more preferably in the range of from 0.1 to 1% by weight.

Pigment

In the present invention, inorganic pigments and organic pigments may be used as the pigment without any particular limitation.

Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, among the above pigments, those having a good affinity for water are used.

The particle diameter of the pigment is preferably not more than 10 μm, more preferably not more then 1 μm. The amount of the pigment added as a colorant is preferably about 0.5 to 25% by weight, more preferably about 2 to 15% by weight.

Regarding the pigment used in the present invention, specific examples of pigments for black ink compositions include carbon blacks (C.I. Pigment Black 7), such as furnace black, lamp black, acetylene black, and channel black, metals, such as copper, iron (C.I. Pigment Black 11), and titanium oxide, and organic pigments, such as aniline black (C.I. Pigment Black 1); and specific examples of pigments for color ink compositions include C.I. Pigment Yellow 1 (Fast Yellow G), 3, 12 (disazo yellow AAA), 13, and 14, 17, 24, 34, 35, 37, 42 (yellow iron oxide), 53, 55, 81, 83(disazo yellow HR), 95, 97, 98, 100, 101, 104, 108, 109, 110, 117, 120, 138, and 153, C.I. Pigment Orange 5, 13, 16, 17, 36, 43, and 51, C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3(Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (iron oxide red), 104, 105, 106, 108 (Cadmium Red), 112, 114, 122 (Quinacridone Magenta), 123, 146, 149, 166, 168, 170, 172, 177, 178, 179, 185, 190, 193, 209, and 219, C.I. Pigment Violet 1 (Rhodamine Lake), 3, 5:1, 16, 19 (Quinacridone Red), 23, and 38, C.I. Pigment Blue 1, 2, 15 (Phthalocyanine Blue R), 15:1, 15:2, 15:3 (Phthalocyanine Blue G), 15:4, 15:6 (Phthalocyanine Blue F), 16, 17:1, 56, 60, and 63, C.I. Pigment Green 1, 4, 7, 8, 10, 17, 18, and 36. Further pigments usable in the present invention include treated pigments which are pigments having a surface treated with a resin or the like, such as graft carbon.

Water and other components

Water used in the ink composition of the present invention is preferably pure water or ultrapure water, such as ion-exchanged water, water purified by ultrafiltration, water purified by reverse osmosis, and distilled water. Further, the use of water, which has been sterilized by ultraviolet irradiation, addition of hydrogen peroxide or the like, is also preferred because it can prevent the growth of mold and bacteria during storage for a long period of time.

The ink composition of the present invention may contain a water-soluble organic solvent as a solvent besides water. Preferred examples of the water-soluble organic solvent include monohydric alcohols such as methanol, ethanol, n-propanol, iso-propanol, n-butanol, sec-butanol, tert-butanol, iso-butanol, and n-pentanol; polyhydric alcohols such as diethylene glycol, polyethylene glycol, polypropylene glycol, ethylene glycol, propylene glycol, butylene glycol, triethylene glycol, 1,2,6-hexanetriol, thioglycol, hexylene glycol, and glycerin; ethers such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; and nitrogen-containing compounds such as urea, 2-pyrrolidone, N-methyl-2-pyrrolidone, and 1,3-dimethyl-2-imidazolidinone.

The amount of the organic solvent is preferably in the range of from 0.5 to 40% by weight, more preferably in the range of from 2 to 20% by weight.

According to a preferred embodiment of the present invention, the ink composition of the present invention may further comprise a saccharide. Preferred examples of the saccharide include monosaccharides, disaccharides, polysaccharides, and sugar derivatives, such as α-cyclodextrin, glucose, xylose, sucrose, maltose, arabinose, maltitol, and starch.

If necessary, suitable additives may be further added to the ink composition of the present invention in order to improve various properties of the ink. Specific examples of the additive include viscosity modifiers, surface tension modifiers, pH adjustors, antimolds, and preservatives. More specifically, water-soluble anionic, cationic, amphoteric, and nonionic surfactants may be added alone or as a mixture of two or more in order to regulate the diameter of dots on a recording paper through the regulation of the surface tension of the ink. Further, the ink composition may contain pH adjustors, such as potassium dihydrogen phosphate and sodium dihydrogen phosphate; and antimolds, preservatives, rust preventives, such as benzoic acid, dichlorophene, hexachlorophene, sorbic acid, p-hydroxybenzoic acid ester, ethylenediaminetetraacetic acid (EDTA), sodium dehydroacetate, and 1,2-benzothiazolin-3-one (trade name: Proxel XLII, manufactured by ICI), 3,4-isothiazolin-3-one. Furthermore, urea, thiourea, ethylene urea and the like may be added from the viewpoint of preventing a nozzle from drying.

Various properties of the ink composition may be regulated as desired. However, according to a preferred embodiment of the present invention, the viscosity of the ink composition is preferably not more than 50 mPa.sec, more preferably not more than 25 mPa.sec. When the viscosity falls within the above range, the ink composition can be stably ejected through a recording head. Further, the surface tension of the ink composition may also be regulated as desired. In the case of a color ink composition for multicolor printing, the surface tension is preferably 30 to 50 mN/m (25° C.).

Preparation of ink composition

The ink composition of the present invention may be prepared by dispersing and mixing the above ingredients together by a suitable method. Preferably, the ingredients except for the organic solvent and low-volatile ingredients are mixed together by means of a suitable dispergator (for example, a ball mill, a roll mill, a sand mill, an attritor, an agitator mill, a Henschel mixer, a colloid mill, a jet mill, an Ong mill, or an ultrasonic homogenizer) to prepare a homogeneous composition, and the organic solvent and low-volatile ingredients are then added thereto. Preferably, the ink composition is then filtered through a metallic filer, a membrane filter or the like under reduced or applied pressure, or alternatively centrifuged.

EXAMPLES

The present invention will now be described in more detail with reference to the following examples, though it is not limited to these examples only.

In the examples, all the composition ratios are in % by weight.

|  | Composition ratio |
|---|---|
| Example 1 | |
| Component A | |
| Carbon black (MA7, manufactured by Mitsubishi Kasei Corp.) | 18 |
| Ammonium salt of styrene/acrylic acid copolymer | 3.6 |
| Ion-exchanged water | Balance |
| Component B | |
| Component A | 33.3 |
| Potassium hydroxide | 0.1 |
| Triethanolamine | 0.9 |
| Glycerin | 15 |
| Ethanol | 3 |
| Ion-exchanged water | Balance |

Ingredients of the component A were mixed and stirred in a jet mill. The diameter of particles in the mixture had been confirmed to be not more than 1 μm by observation under a microscope. Further, ingredients of the component B were mixed with stirring and then filtered through a 3-μm membrane filter to remove deposits and coarse particles, thereby preparing an ink composition.

Ink compositions of the following Examples 2 to 7 and Comparative Examples 1 and 2 were prepared in substantially the same manner as in Example 1.

|  | Composition ratio |
|---|---|
| Example 2 | |
| Component A | |
| Carbon black (Raven 1080, manufactured by Columbian Carbon) | 20 |
| Ammonium salt of styrene/acrylic acid copolymer | 4 |
| Ion-exchanged water | Balance |
| Component B | |
| Component A | 25 |
| Potassium hydroxide | 0.2 |
| Diethanolamine | 2 |
| Glycerin | 8 |
| Ethanol | 3 |
| Ion-exchanged water | Balance |
| Example 3 | |
| Component A | |
| Carbon black (MA100, manufactured by Mitsubishi Kasei Corp.) | 15 |
| Ammonium salt of styrene/maleic acid copolymer | 3 |
| Ion-exchanged water | Balance |
| Component B | |
| Component A | 40 |
| Sodium hydroxide | 0.5 |
| Monoethanolamine | 0.1 |
| Diethylene glycol | 12 |
| Ethanol | 2 |
| Ion-exchanged water | Balance |
| Example 4 | |
| Component A | |
| Carbon Black (MA7) | 18 |
| Ammonium salt of styrene/methacrylic acid copolymer | 3.6 |
| Ion-exchanged water | Balance |
| Component B | |
| Component A | 33.3 |
| Potassium hydroxide | 1 |
| Triethanolamine | 1 |
| Glycerin | 5 |
| Diethylene glycol | 5 |
| Ethanol | 2 |
| Ion-exchanged water | Balance |
| Example 5 | |
| Component A | |
| Copper phthalocyanine | 19.5 |
| Ammonium salt of styrene/methacrylic acid copolymer | 4 |
| Ion-exchanged water | Balance |
| Component B | |
| Component A | 15 |
| Potassium hydroxide | 0.1 |
| Triethanolamine | 0.9 |
| Glycerin | 10 |
| 2-Pyrrolidone | 2 |
| Ethanol | 3 |
| Ion-exchanged water | Balance |
| Example 6 | |
| Component A | |
| C.I. Pigment Red 122 | 19 |
| Ammonium salt of styrene/methacrylic acid copolymer | 4 |
| Ion-exchanged water | Balance |
| Component B: the same as component B in Example 5 | |
| Example 7 | |
| Component A | |
| C.I. Pigment Yellow 17 | 13 |
| Ammonium salt of styrene/methacrylic acid copolymer | 2.7 |
| Ion-exchanged water | Balance |
| Component B: the same as component B in Example 5 | |
| Comparative Example 1 | |
| Component A | |
| Carbon black (MA7) | 18 |
| Ammonium salt of styrene/acrylic acid copolymer | 3.6 |
| Ion-exchanged water | Balance |
| Component B | |
| Component A | 33.3 |
| Potassium hydroxide | 0.1 |
| Glycerin | 15 |
| Ethanol | 3 |
| Ion-exchanged water | Balance |

Comparative Example 1 is an ink composition not containing triethanolamine.

| Comparative Example 2 | Composition ratio |
|---|---|
| Component A | |
| Carbon black (MA7) | 18 |
| Ammonium salt of styrene/acrylic acid copolymer | 3.6 |
| Ion-exchanged water | Balance |
| Component B | |
| Component A | 33.3 |
| Triethanolamine | 0.9 |
| Glycerin | 15 |
| Ethanol | 3 |
| Ion-exchanged water | Balance |

Comparative Example 2 is an ink composition not containing potassium hydroxide.

Evaluation tests

The inks prepared in Examples 1 to 7 and Comparative Examples 1 and 2 were evaluated as follows.

Evaluation 1: Clogging

Printing was carried out using an ink jet printer MJ-500 (manufactured by Seiko Epson Corporation) to confirm that an ink could be ejected through all nozzles of a recording head. Thereafter, the printer was stopped and allowed to stand with an ink feed port and a nozzle cap being opened at room temperature and 40° C. One month after the initiation of standing, the total amount of the ink sucked in the cleaning operation necessary for resumption of normal printing was evaluated as follows.

⊚: Not larger than 1 cc

Δ: Larger than 1 to not larger than 5 cc

X: Larger than 5 cc

Evaluation 2: Quality of print

Printing was carried out by means of an ink jet printer MJ-500 using the ink composition on the following 10 papers.

Paper for evaluation
1) Xerox P (Fuji Xerox Co,. Ltd.)
2) Ricopy 6200 (Ricoh Co., Ltd.)
3) EPP (Seiko Epson Corporation)
4) Xerox R: recycled paper (Fuji Xerox Co., Ltd.)
5) Yamayuri: recycled paper (Honshu Paper Co., Ltd.)
6) Conqueror Laid: European paper
7) Rapid Copy: European paper
8) Mode Copy: European paper
9) Neenah Bond: American paper
10) Xerox 4024 3R 721: American paper Evaluation criteria ⊚: Neither bleeding nor feathering occurred with the image being sharp.

Δ: Bleeding and/or feathering somewhat occurred.

X: Bleeding and/or feathering significantly observed.

Evaluation 3: Print density

Printing was carried out using the black ink compositions of Examples 1 to 4 on the 10 papers used in the evaluation 2. The print density was measured at 10 points with a Macbeth PCMII densitometer in a slit width of 200 μm. The average value of the measurements was evaluated according to the following criteria.

⊚: OD value of not less than 1.4.

o: OD value of 1.3 to less than 1.4.

X: OD value of less than 1.3.

Evaluation 4: Storage stability

The ink composition was sealed into a glass bottle and allowed to stand in an environment of room temperature, −20° C., or 50° C. for 2 months. Thereafter, the degree of coagulation of pigment particles in the ink composition was observed under a microscope. The results were evaluated according to the following criteria.

⊚: Neither coagulation nor solidification observed at all the test temperatures.

Δ: Coagulation was likely to occur at the low test temperature.

X: Coagulation and solidification occurred.

TABLE 1

| | Evaluation 1 | | Evaluation 2 | Evaluation 3 | Evaluation 4 |
|---|---|---|---|---|---|
| | Room temp. | 40° C. | | | |
| Ex. 1 | ⊚ | ⊚ | ⊚ | ⊚ | ⊚ |
| Ex. 2 | ⊚ | ⊚ | ⊚ | ⊚ | ⊚ |
| Ex. 3 | ⊚ | ⊚ | ⊚ | ⊚ | ⊚ |
| Ex. 4 | ⊚ | ⊚ | ⊚ | ⊚ | ⊚ |
| Ex. 5 | ⊚ | ⊚ | ⊚ | — | ⊚ |
| Ex. 6 | ⊚ | ⊚ | ⊚ | — | ⊚ |
| Ex. 7 | ⊚ | ⊚ | ⊚ | — | ⊚ |
| Comp. Ex. 1 | ⊚ | Δ | ⊚ | ⊚ | ⊚ |
| Comp. Ex. 2 | ⊚ | Δ | ⊚ | ⊚ | ⊚ |

We claim:

1. An ink composition comprising a pigment, a dispersant, and water,
   the dispersant being a polymeric dispersant having a carboxyl group,
   the ink composition further comprising
   a hydroxide of an alkali metal and
   an alcoholamine having at least one hydroxyl group.

2. The ink composition according to claim 1, wherein the composition comprises 0.1 to 1% by weight of hydroxide of an alkali metal and 0.1 to 2% by weight of the alcoholamine having at least one hydroxyl group.

3. The ink composition according to claim 1, wherein the alkali metal is selected from the group consisting of lithium, sodium, and potassium.

4. The ink composition according to claim 1, wherein the alcoholamine is selected from the group consisting of monoethanolamine, diethanolamine, and triethanolamine.

5. The ink composition according to claim 1, wherein the pigment, the dispersant, the hydroxide of the alkali metal, the alcoholamine and the water are present in respective amounts such that the composition is suitable for ink jet recording.

6. An ink jet recording method comprising the step of ejecting droplets of an ink composition according to claim 1 to deposit the droplets onto a recording medium.

7. The ink jet recording method according to claim 6, wherein color printing is carried out using a yellow ink composition, a magenta ink composition, and a cyan ink composition and optionally a black ink composition.

8. A printed medium recorded by an ink composition according to claim 1.

9. An ink composition comprising a pigment, a polymeric dispersant having a carboxyl group, a hydroxide of an alkali metal, an alcoholamine, water and, optionally, other components, said pigment being present in the composition in an mount of about 0.5 to 25% by weight, said dispersant being present in the composition in an amount such that the ratio of the pigment to the dispersant is in a range of 1:0.06 to 1:3, the hydroxide of the alkali metal being present in the composition in an amount of from 0.1 to 1% by weight, the alcoholamine being present in the composition in an amount of from 0.1 to 2% by weight, and the water and optional other components making up the balance of the composition.

10. An ink composition according to claim 9 wherein the composition comprises a water-soluble organic solvent as one of the optional other components, said water-soluble organic solvent being present in the composition in an amount of 0.5 to 40% by weight.

11. An ink jet recording method comprising the step of ejecting droplets of an ink composition according to claim 2 to deposit the droplets onto a recording medium.

12. An ink jet recording method comprising the step of ejecting droplets of an ink composition according to claim 3 to deposit the droplets onto a recording medium.

13. An ink jet recording method comprising the step of ejecting droplets of an ink composition according to claim 4 to deposit the droplets onto a recording medium.

14. An ink jet recording method comprising the step of ejecting droplets of an ink composition according to claim 9 to deposit the droplets onto a recording medium.

15. An ink jet recording method comprising the step of ejecting droplets of an ink composition according to claim 10 to deposit the droplets onto a recording medium.

* * * * *